F. F. DAVIS.
PISTON WRIST PIN CONSTRUCTION.
APPLICATION FILED DEC. 8, 1919.

1,392,819. Patented Oct. 4, 1921.

Witnesses:
R. H. Gamble,
Augustus B. Copper

Inventor
Frank F. Davis,
By Joshua R. H. Potts
his Attorney

UNITED STATES PATENT OFFICE.

FRANK FOSTER DAVIS, OF CHESTER, PENNSYLVANIA.

PISTON-WRIST-PIN CONSTRUCTION.

1,392,819.  Specification of Letters Patent.  Patented Oct. 4, 1921.

Application filed December 8, 1919. Serial No. 343,326.

*To all whom it may concern:*

Be it known that I, FRANK F. DAVIS, a citizen of the United States, residing at Chester, in the county of Delaware and State of Pennsylvania, have invented certain new and useful Improvements in Piston-Wrist-Pin Constructions, of which the following is a specification.

One object of my invention is to provide an improved wrist pin construction for engine pistons whereby the wrist pin can be easily and quickly inserted and removed.

Another object is to so make my improved wrist pin construction that when in operative position there will be no parts exposed which will injure the cylinder in which the piston is operating.

A further object is to so construct my invention that it will permit proper lubrication to the parts thereof and to the connecting rod.

A still further object is to make my invention of a strong, simple and durable construction and so that it can be manufactured quickly and cheaply.

These objects, and other advantageous ends which will be described hereinafter, I attain in the following manner, reference being had to the accompanying drawing, in which—

Figure 1:
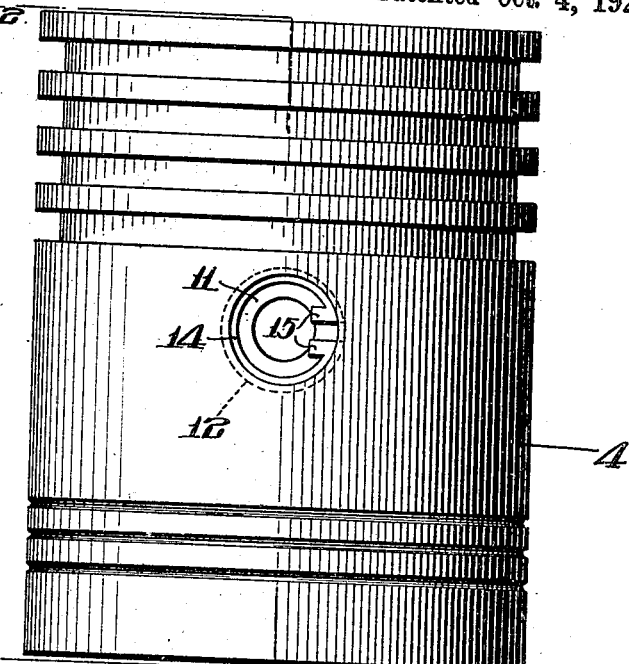
Figure 1 is an outside elevation of a piston illustrating my invention.
Figure 3:
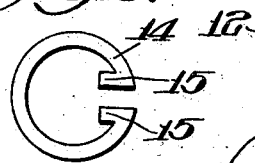
Fig. 3 is a face view of a split retaining ring which forms a part of my invention.
Figure 2:
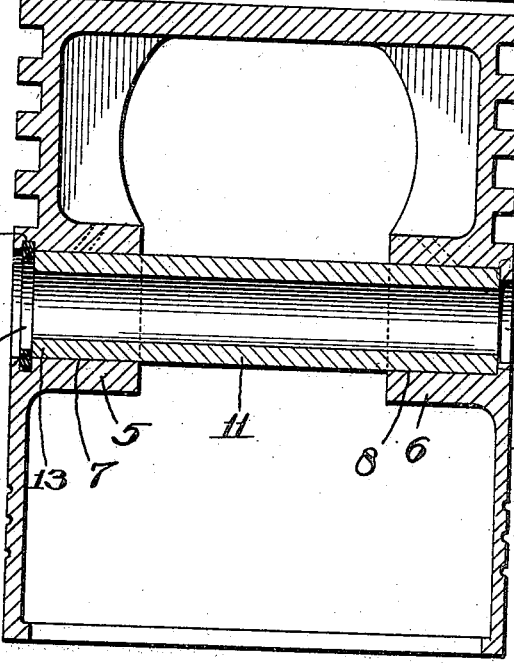
Fig. 2 is a sectional view taken on the line 2—2 of Fig. 1.

Referring to the drawing, 4 represents a piston of the type employed in internal combustion engines; the same being closed at its top and open at the bottom for the entrance of the usual connecting rod (not illustrated). This piston includes two inwardly projecting bosses 5 and 6. The boss 5 has a hole 7 bored entirely therethrough transversely to the axis of the piston. The boss 6 has a hole 8 bored therein in alinement with the hole 7 and of equal diameter. It is obvious that the holes 7 and 8 can be bored at the same boring operation. The hole 8 does not extend entirely through the boss and a shoulder 9 is thus provided. A hole 10 of smaller diameter than the hole 8 leads outwardly from the hole 8 to the outside of the piston, as clearly shown in Fig. 2.

A hollow bar or wrist pin 11 is adapted to be slipped into the holes 7 and 8; one end of the pin abutting the shoulder 9 and the other end being located entirely within the hole 7 inwardly from the outer face of the piston. The hole 7 includes an annular groove 12 of larger internal diameter than said hole 7; said groove being located at a distance inwardly from the outer face of the piston and having its innermost portion directly adjacent the end 13 of the wrist pin.

A resilient split ring 14 has a normal outer diameter larger than the diameter of the hole 7 and is adapted, when compressed, to be pushed into the hole 7 and released to spring or expand into the groove 12. The internal diameter of the ring 14, when the latter is within the groove 12, is less than that of the outer diameter of the wrist pin 11 so that the wrist pin is confined between the shoulder 9 and the ring 14.

In operation there are no portions exposed which would tend to cut or otherwise injure the cylinder in which the piston is located. Also the construction as above described provides entrance openings to permit oil to lead inwardly to lubricate the bearing of the wrist pin since it is quite obvious that oil can enter through the hole 10 and through the opposite end of the hole 7 and split ring 14.

To remove the wrist pin 11, it is merely necessary to compress the split ring 14 so that it can be pulled out of the hole 7 and I preferably provide the split ring with two inwardly projecting extensions 15 which can be grasped and squeezed together so as to pull the ring from the groove 12.

While I have described my invention as taking a particular form, it will be understood that the various parts of my invention may be changed without departing from the spirit thereof, and hence I do not limit myself to the precise construction set forth but consider that I am at liberty to make such changes and alterations as fairly come within the scope of the appended claims.

Having thus described my invention, what I claim as new and desire to secure by Letters Patent is:—

1. A piston having a hole bored through one side and an axially opposed cavity in the other side leading outwardly from the inner surface and terminating in a shoulder, said cavity being of a diameter substantially similar to the diameter of said hole; a wrist pin having opposite ends bearing in said hole and cavity whereby one end of the pin abuts said shoulder and thereby prevents longitudinal movement of said pin in one direction; and locking means within said hole for preventing longitudinal movement of the pin in the opposite direction; substantially as described.

2. A piston having a hole bored through one side and an axially opposed cavity in the other side leading outwardly from the inner surface and terminating in a shoulder; a hollow wrist pin having opposite ends bearing in said hole and cavity whereby one end of the pin abuts said shoulder; and locking means within said hole for holding the pin in place, said second mentioned side of the piston having a hole of smaller diameter than the pin and cavity and leading outwardly from said pin and cavity to the outer surface of the piston; substantially as described.

In testimony whereof I have signed my name to this specification in the presence of two subscribing witnesses.

FRANK FOSTER DAVIS.

Witnesses:
M. R. TURK,
J. W. RUDOLPH.